Nov. 11, 1969　　　　　F. P. AUGER　　　　　3,477,207
GAS CHROMATOGRAPHY APPARATUS AND VALVES
SUITABLE FOR USE THEREIN
Filed Aug. 3, 1967　　　　　　　　　　　　　2 Sheets-Sheet 2
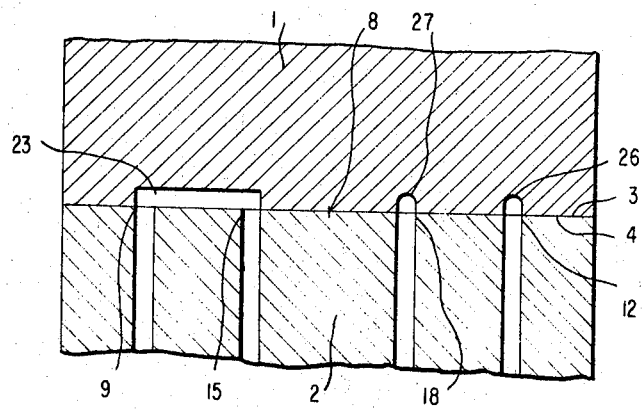
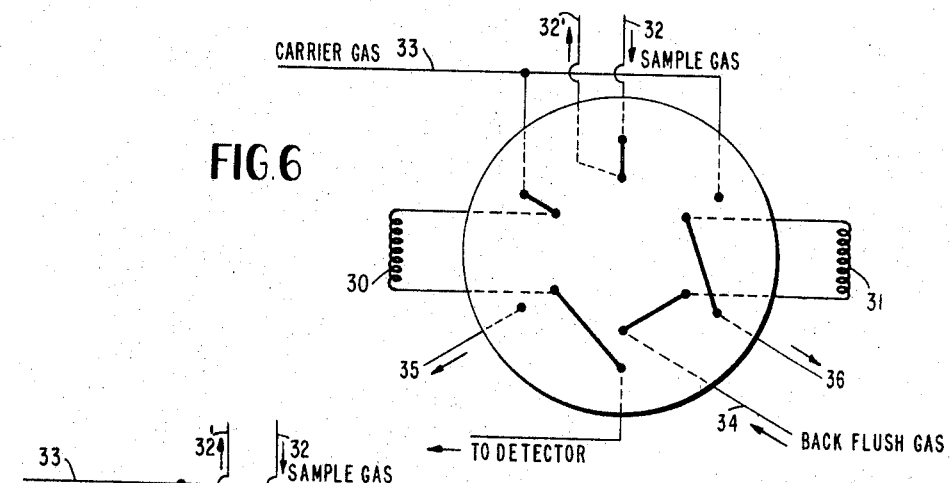
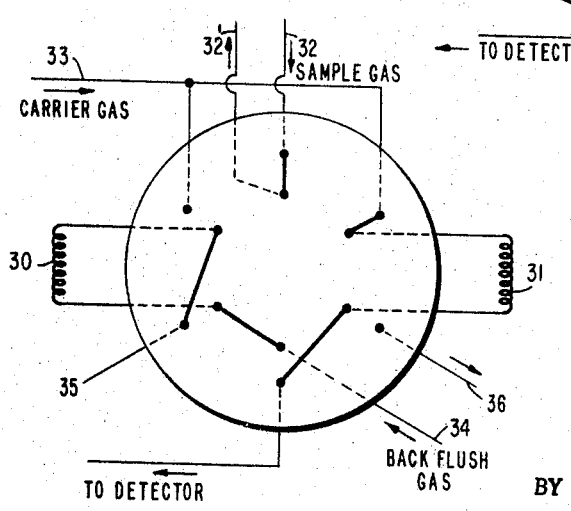
INVENTOR
FRANK PAWLEY AUGER
BY Jacobs and Jacobs
ATTORNEYS

United States Patent Office 3,477,207
Patented Nov. 11, 1969

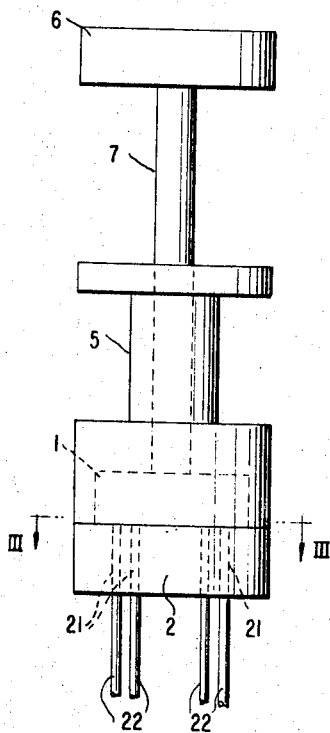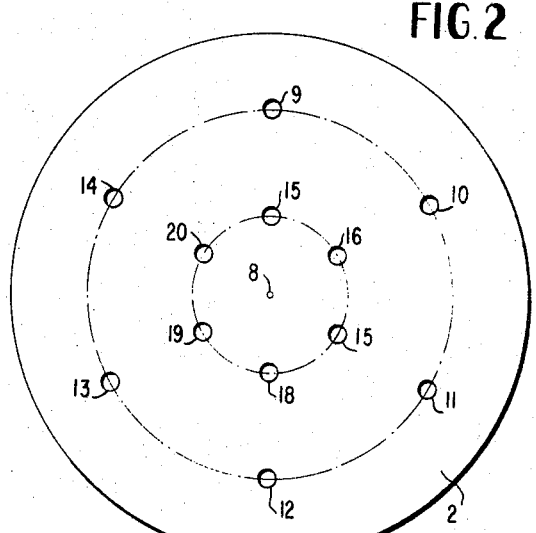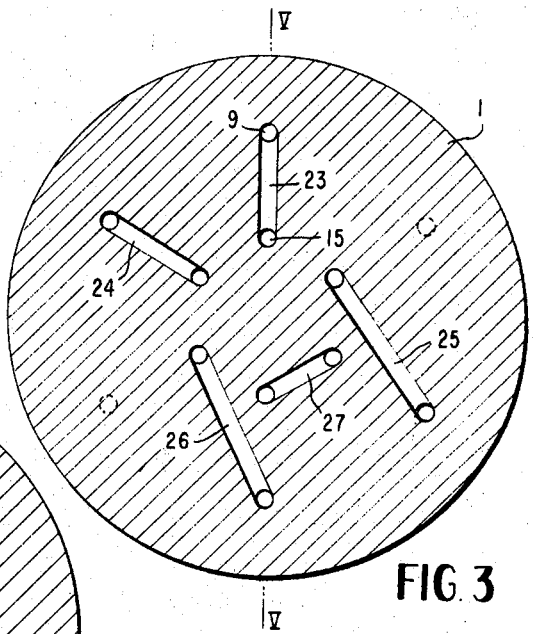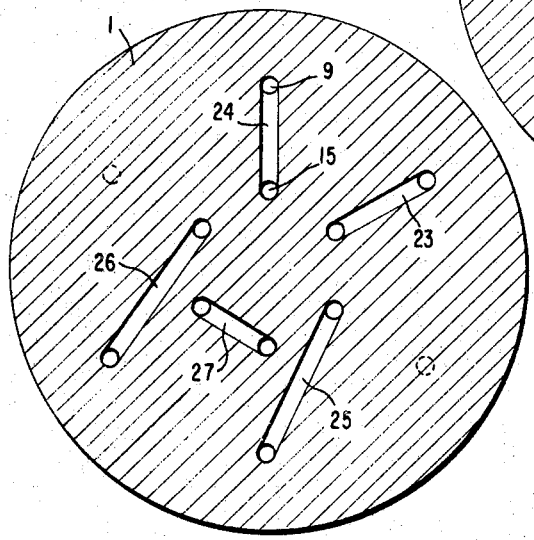

3,477,207
GAS CHROMATOGRAPHY APPARATUS AND VALVES SUITABLE FOR USE THEREIN
Frank Pawley Auger, Surbiton, England, assignor to BP Chemicals (U.K.) Limited, London, England, a British company
Filed Aug. 3, 1967, Ser. No. 658,084
Claims priority, application Great Britain, Aug. 9, 1966, 35,517/66
Int. Cl. B01d 15/08
U.S. Cl. 55—197                             6 Claims

ABSTRACT OF THE DISCLOSURE

A valve suitable for use in gas chromatography which comprises two mating faces, rotatable relative to one another, one face having slots and the other a set of ports disposed around the centre of rotation of the two faces, wherein a second set of ports is provided between the centre of rotation and the first set of ports.

---

The present invention relates to valves suitable for use in gas chromatography apparatus.

In analysis by gas chromatography of gas streams it is necessary to take a sample of the gas stream and pass it rapidly, in suitable carrier, into a column with the minimum disturbance of the gas stream from which the sample is taken. It is known to use for this purpose valves consisting of two flat polished faces which can be rotated relative to each other between a plurality of given positions, one of the faces having a ring of ports equidistant from the centre of rotation opening on to the face, while the other face is provided with slots which connect pairs of adjacent ports when the two faces are in one of the given positions.

When the valve is in operation the gas stream to be sampled, hereinafter referred to as the sample stream, is applied to one of a pair of ports, which will be referred to as the sample inlet and outlet ports the faces being in a given position relative to one another, which may be described as an operational position, so that a slot provides a pathway for the sample stream from one of the two adjacent ports to the next. The sample for analysis by the gas chromatography column is taken by rotating the faces relative to each other to another operational position so that the slot filled with a fixed quantity of the sample gas is brought into communication with two different ports through which a carrier gas stream is passed thereby carrying the sample with the carrier gas into a suitable column. At the same time a second slot is brought into communication with the sample inlet and outlet ports and the sample stream continues to flow from one port to the other through the second slot, having suffered only momentary interruption as the valve was switched from one given operational position to the other. A fresh sample may be obtained by bringing the first slot back to its original position and repeating the process, or by bringing the second slot into communication with the carrier gas.

In the monitoring of a substance in a sample stream using gas chromatography it is found that the detector used to measure the concentration of substances leaving the column will show peaks caused by other substances in the sample stream in addition to those peaks which are of interest. In order to clear the column for the next analysis the carier gas may be pased through the column until no more peaks are registered by the detector and the column is free of sample, or provision may be made for blowing the sample back through the column by passing a back-flush gas stream through the column in a reverse direction to that in which the carrier gas carries the sample through the column. In either case some time will elapse after the peak caused by the substance being monitored has been registered by the detector before the next analysis can be carried out. This time lag may often be undesirable and could be reduced if two or more columns could be used consecutively. However, it has not been possible to do this using a single sampling valve of the known type described above.

We have now developed a valve which when used in gas chromatography analysis systems enables monitoring of substances in gas streams to be carried out at more frequent intervals than is possible with arrangements making use of single valves of the type described above, and which enables very compact units for gas chromatography to be produced.

According to the present invention a gas chromatography apparatus comprises two gas chromatography columns, a detector, and a valve, the valve having two mating faces capable of rotation relative to one another, one face being provided with ports and the other face with slots whereby on rotation of the faces relative to each other from one given position to another different pair of ports are brought into communication, wherein (i) there is a set of outer ports and a set of inner ports, (ii) the first gas chromatography column is connected across one pair of ports, the second gas chromatography column is connected across another pair of ports, (iii) a sample stream inlet, a sample stream outlet, one or more carrier gas inlets, the detector, one or more back-flush inlet and outlets are each connected to separate ports, (iv) the slots are so disposed that when sample stream, carrier gas and back-flush gas are fed to their respective inlets in a first given relative position of the two faces sample stream passes through a first slot to the sample stream outlet, back-flush gas passes through the first column to the back-flush outlet and sample previously introduced to a second slot is carried by carrier gas through the second column to the detector, and in a second given relative position of the faces sample stream passes through a second slot to the sample stream outlet, back-flush gas passes through the second column to the back-flush outlet, and sample contained in the first slot s carried by carrier gas through the first column to the detector.

The packing of the columns used will depend on the gases to be separated and the columns may be made of any material capable of withstanding the gases and vapours used at the temperature at which the column is operated. The columns may suitably be made of metal-pipe, coiled to save space, and provision may be made for attaching the columns to the valve by standard couplings. The detector used will depend on the substance or substances to be detected. An example of a suitable type of detector is the thermal conductivity cell.

The gas inlets and outlets in the valve may be designed to be attached to suitable pipework by standard or special couplings. Examples of the columns, detector and couplings which may be used are described by Munday and Primavesi in "The Analyst" vol. 88 No. 1048 pp. 551–557.

A suitable form of valve according to the present invention has:

(a) A set of 6 outer ports and 6 inner ports, the outer ports being at one fixed distance from the centre of rotation of the mating faces, while the inner ports are at another, lesser, fixed distance from the centre of rotation, each inner port being at a fixed distance from the nearest outer port.

(b) Five non-intersecting slots disposed so that when the two faces are in a given position relative to each other a first slot connects an outer port to the nearest inner port, the ports connected by the first slot constituting a first pair of ports, a second slot connects an outer port adjacent to the outer port of the first pair to the nearest inner port, the ports connected by the second slot constituting a second pair of ports, and a third slot connects the inner port next adjacent to the inner port of the first pair of ports to the port next but one adjacent to the outer port of the first pair of ports, a fourth slot connects the inner port next adjacent to the inner port of the second pair of ports to the outer port next but one adjacent to the outer port of the second pair of ports, and a fifth slot connects the inner ports next but one adjacent to the inner ports of the first and second pairs of ports respectively.

The ports in the valve may be arranged so that the outer and the inner ports are on the circumference of two concentric circles and the inner ports are on the lines joining the outer ports to the centre of the circle, while two outer ports and the centre are co-linear and the remaining ports are disposed symmetrically about a line joining the aforesaid two outer ports. The ports and slots are preferably so disposed that in whichever given operational position of the faces all the pairs of ports connected by slots are at the extremities of the slots so avoiding any dead space in the slot. For this preferred condition to be attained both sets of ports inner and outer lie on the circumference of concentric circles and are equally spaced round the circumference of the circles that is any port in a set is equidistant from the centre of rotation and from the two adjacent ports in the set. Preferably the inner ports are so disposed that the centre of rotation, an inner port and the nearest outer port are colinear.

A specific embodiment of a valve according to the present invention, and its application in gas chromatography will now be described with reference to the accompanying drawings wherein FIGURE 1 is a side view of the valve, with the internal layout indicated by dotted lines, FIGURES 2, 3 and 4 are views of the mating faces which are moved relative to one another to operate the valve, FIGURE 2 being a plan view of the mating face of block 2 of FIGURE 1. FIGURE 3 is a section through the rotor (shown as 1 in FIGURE 1) in one of the operational positions, along the line III—III. FIGURE 4 is a similar cross-section to FIGURE 3, with the rotor in the other operational position.

FIGURE 5 is a cross section of part of the rotor and stator adjacent to the mating faces along the line V—V, FIGURE 3 showing the ports and slots in the stator and rotor.

FIGURES 6 and 7 are diagrams showing the use of the valve to switch samples between two gas chromatography columns.

The valve comprises a block 1 (the rotor) which mates with a block 2 (the stator), the mating faces being 3 and 4 respectively. The rotor 1 is held in place by a valve cap 5 surrounding it, the valve cap being fixed to the block 2. An operating knob 6 is connected to the rotor 1 by shaft 7 passing through the valve cap 5, rotation of the operating knob causing the rotor to rotate relative to the stator about a centre of rotation 8. Face 4 of block 2 is provided with a set of circular ports 9 to 20, which communicate through passageways 21 formed in block 1 with connecting pipes 22, attached by any convenient method e.g. brazing, to the valve block 2, on the outside of the valve whereby other pieces of apparatus may be connected to the valve. Ports 9–14 are located on one circle whose centre is 8 and are equally spaced around the circumference. Ports 15–20 are located on a smaller concentric circle and lie on the radii drawn between ports 9 to 14 respectively and the centre of rotation 8. Face 3 of block 1 has slots 23 to 27 cut into it and block 1 may be oscillated by the operating knob between two fixed operational positions shown in FIGURE 3 and FIGURE 4.

When the valve is used as part of a gas chromatograph apparatus to monitor the concentration of a substance in a sample stream, the source of the sample stream is connected to port 9 by means of the external connector referred to above, which acts as the sample stream inlet. The sample stream is removed by way of port 15, which is in communication with the sample stream outlet.

A source of carrier gas is connected to carrier gas inlets on the outside of the valve in communication with ports 10 and 14. A gas chromatography column suitable for the analysis to be undertaken is connected to connectors in communication with ports 19 and 20, and a second column is similarly attached across ports 16 and 17. A source of back-flush gas is connected to port 18 by way of a back-flush inlet, and a pipe leading to a detector, of suitable type for measurement of the substance being monitored, is attached to a connector in communication with port 12. Pipes to carry away back-flush gas are attached to connectors in communication with ports 11 and 13.

With the valve in position shown in FIGURE 3, the sample stream passes continuously through slot 23. When the block 1 is moved to the position shown in FIGURE 4, a portion of the sample gas is trapped in slot 23 as block 1 moves and is carried by the carrier gas entering slot 23 through port 10, out of slot 23 through port 16 to one of the two columns, through which it passes entering slot 25 at port 17 and leaving it at port 12 to pass through the detector. Meanwhile, the block 1 still being in the position of FIGURE 4, back-flush gas enters slot 27 at port 18 and leaves the slot at port 19 to pass through the other column, cleaning it of any trace of sample and leaving the column by port 20, slot 26 and port 13 to be discharged to the back-flush exit pipe. Sample gas is simultaneously passed through slot 24.

When the block 1 is moved back to the position shown in FIGURE 3, sample is trapped in slot 24 and then swept by carrier gas from port 14 by way of port 20 through the other column leaving the column for the detector by way of slot 26. Back-flush gas is meanwhile passed by way of port 18, slot 27 port 17 to the second column, being discharged by way of port 16 slot 25 and port 11 to a back-flush discharge pipe.

The flow paths through the valve are shown in FIGURES 6 and 7 the dotted lines within the circle indicating connections to the ports in the stator while the full lines within the circle indicate the slots in the stator. The two gas chromatography columns are shown at 30 and 31, a sample stream being fed to the valve by line 32 and leaving by line 32. The carrier gas is supplied by line 33, and the back-flush gas is supplied by line 34, while lines 35 and 36 carry gas to waste.

The block 1 is oscillated between the two positions shown in FIGURE 3 and FIGURE 4 by the operating knob at a time interval sufficient to allow peaks of sample concentration of interest to reach the detector after the carrier gas has been admitted to the slot carrying the sample. This time interval will generally be sufficient for the back-flush gas stream to remove portions of the sample still remaining in the column.

The valve and the apparatus incorporating it described above may be modified in various ways. For example, the straight slots shown in the drawings may be replaced by curved slots so shaped as to give the maximum distance between any part of one slot and the nearest part of an adjacent slot, thus reducing the possibility of gas leaking from one slot to the next along the interface between the two blocks.

I claim:

1. A gas chromatography apparatus which comprises in combination two gas chromatography columns; a detector, and a valve, the valve having two mating faces capable of rotation relative to one another, one face being provided with ports and the other face with slots whereby on rotation of the faces relative to each other from one given position to another, different pairs of ports are brought into communication by the slots, wherein (i) there is a set of outer ports and a set of inner ports (ii) at least two slots connect pairs of ports constituted by a port in the inner set of ports with the next but one adjacent port in the outer sets of ports (iii) the first gas chromatography column is connected across one pair of ports and the second gas chromatography column is connected across another pair of ports (iv) a sample stream inlet, a sample stream outlet, at least one carrier gas inlet, the detector, at least one back-flush inlet and at least one back-flush outlet are each connected to separate ports, (v) the slots are so disposed that when sample stream, carrier gas and back-flush gas are fed to their respective inlets in a first given relative position of the two faces sample stream passes through a first slot to the sample stream outlet, back-flush gas passes through the first column to the back-flush outlet and sample previously introduced to a second slot is carried by carrier gas through the second column to the detector, and in a second given relative position of the faces sample stream passes through the second column to the back-flush outlet, and sample contained in the first slot is carried by carrier gas to the detector.

2. A gas chromatography apparatus according to claim 1 wherein the detector is a thermal conductivity cell.

3. A valve suitable for use in gas chromatography which comprises a valve having two valve members each member having a face, which mates with a face on the other member to constitute a pair of mating faces which faces are rotatable relative to each other about a centre of rotation, one face being provided with ports and the other face with slots wherein
(a) the face provided with ports has a set of 6 outer ports and 6 inner ports, the outer ports being at one fixed distance from the centre of rotation of the mating faces, while the inner ports are at another lesser fixed distance from the centre of rotation, each inner port being at a fixed distance from the nearest outer port,
(b) the face provided with slots is provided with slots disposed so that when the two faces are in a given position relative to each other a first slot connects an outer port to the nearest inner port, the ports connected by the first slot constituting a first pair of ports, a second slot connects an outer port adjacent to the outer port of the first pair to the nearest inner port, the ports connected by the second slot constituting a second pair of ports, and a third slot connects the inner port next adjacent to the inner port of the first pair of ports with the port next but one adjacent to the outer port of the first pair of ports, a fourth slot connects the inner port next adjacent to the inner port of the second pair of ports with the outer port next but one adjacent to the outer port of the second pair of ports, and a fifth slot connects together the inner ports next but one adjacent to the inner ports of the first and second pairs of ports respectively.

4. The valve according to claim 3 wherein the inner and outer ports are on the circumference of two circles, having a common centre at the centre of rotation, each inner port being co-linear with an outer port and the centre of the circle, the ports being disposed symmetrically about a line joining two of the outer ports.

5. The valve according to claim 4 wherein the ports are equally spaced around the circumference of the circles on which they lie.

6. The valve according to claim 5 wherein each inner port, the nearest outer port and the centre of rotation, are co-linear.

References Cited
UNITED STATES PATENTS

| | | | |
|---|---|---|---|
| 2,981,092 | 4/1961 | Marks | 55—67 X |
| 3,220,164 | 11/1965 | Golay | 55—67 |
| 3,223,123 | 12/1965 | Young | 137—625.46 |
| 3,249,403 | 5/1966 | Bochinski et al. | 73—23.1 |

JAMES L. DECESARE, Primary Examiner

U.S. Cl. X.R.

137—625.46